US009801391B2

(12) United States Patent
Petronio et al.

(10) Patent No.: US 9,801,391 B2
(45) Date of Patent: Oct. 31, 2017

(54) PROCESS FOR THE PRODUCTION OF COOKIES HAVING IMPROVED ORGANOLEPTIC PROPERTIES

(71) Applicant: Barilla G. e R. Fratelli S.p.A., Parma (IT)

(72) Inventors: Michela Petronio, Parma (IT); Luca Guasina, Lesignano Bagni (IT); Marco Giovanetti, Parma (IT); Nadia Morbarigazzi, Parma (IT); Claudio Dall'Aglio, Parma (IT)

(73) Assignee: Barilla G. e R. Fratelli S.p.A., Parma (IT)

( * ) Notice: Subject to any disclaimer, the term of this patent is extended or adjusted under 35 U.S.C. 154(b) by 0 days.

(21) Appl. No.: 14/100,929

(22) Filed: Dec. 9, 2013

(65) Prior Publication Data

US 2014/0099420 A1  Apr. 10, 2014

Related U.S. Application Data

(63) Continuation-in-part of application No. 13/095,598, filed on Apr. 27, 2011.

(30) Foreign Application Priority Data

Apr. 30, 2010  (EP) .................................. 10425142

(51) Int. Cl.
*A21D 10/00* (2006.01)
*A21D 8/06* (2006.01)
(Continued)

(52) U.S. Cl.
CPC ................. *A21D 8/06* (2013.01); *A21B 7/00* (2013.01); *A21D 2/36* (2013.01); *A21D 13/06* (2013.01);
(Continued)

(58) Field of Classification Search
CPC . A21D 8/06; A21D 2/36; A21D 13/06; A21B 7/00; A23L 1/1016
See application file for complete search history.

(56) References Cited

U.S. PATENT DOCUMENTS

| 3,879,563 A | 4/1975 | Tucker et al. |
| 4,701,340 A | 10/1987 | Bratton et al. |

(Continued)

FOREIGN PATENT DOCUMENTS

| EP | 0107315 B1 * | 5/1989 | ............... A21D 2/26 |
| EP | 0387933 B1 * | 4/1993 | |

(Continued)

OTHER PUBLICATIONS

"What is an Impingement Oven" Oct. 11, 2012 http://web.archive.org/web/20121011032701/http://www.ehow.com/info_12121410_impingement-oven.html.*

(Continued)

*Primary Examiner* — Katherine D Leblanc
(74) *Attorney, Agent, or Firm* — Akerman LLP

(57) ABSTRACT

A process is described for the production of shortbread-type cookies, characterised in that it comprises the steps of: mixing the ingredients of a cookie dough, forming the cookie dough to form semi-finished products, baking the semi-finished products formed from the dough, thus obtaining the cookies, cooling the cookies obtained and packaging of the cookies; wherein the step of baking the semi-finished products comprises a step of exposure thereof to a hot gas consisting of hot air and superheated steam, blown directly on the semi-finished products by means of an impingement system; a description is also given of a cookie comprising, in weight per total weight, a dietary fibre content comprised
(Continued)

Example 1: Comparison by appearance and volume between 1 and 25%, a lipids content comprised between 4 and 23% and a simple sugars content comprised between 8 and 26%.

15 Claims, 12 Drawing Sheets

(51) Int. Cl.
*A21B 7/00* (2006.01)
*A21D 13/06* (2017.01)
*A21D 2/36* (2006.01)
*A23L 7/10* (2016.01)
*A23L 33/21* (2016.01)

(52) U.S. Cl.
CPC ............... *A23L 7/115* (2016.08); *A23L 33/21* (2016.08); *A23V 2002/00* (2013.01)

(56) References Cited

U.S. PATENT DOCUMENTS

| | | | |
|---|---|---|---|
| 4,770,890 A | | 9/1988 | Giddey et al. |
| 4,965,435 A | | 10/1990 | Smith et al. |
| 5,560,952 A | | 10/1996 | Miller et al. |
| 5,786,566 A | | 7/1998 | Miller et al. |
| 5,932,269 A | * | 8/1999 | Huang et al. ............... 426/549 |
| 6,146,678 A | | 11/2000 | Caridis et al. |
| 6,572,911 B1 | | 6/2003 | Corcoran et al. |
| 7,008,658 B2 | * | 3/2006 | Newman et al. ............ 426/281 |
| 2003/0217645 A1 | | 11/2003 | Jones et al. |
| 2005/0031755 A1 | * | 2/2005 | Maningat et al. ............ 426/549 |
| 2006/0118099 A1 | * | 6/2006 | Dimouamoua ........ A21B 1/245 126/21 A |
| 2008/0138472 A1 | * | 6/2008 | Alexandre ............... A21D 2/18 426/104 |

FOREIGN PATENT DOCUMENTS

| | | |
|---|---|---|
| GB | 2242605 A | 10/1991 |
| JP | 2000-236798 A | 9/2000 |

OTHER PUBLICATIONS

Anonymous, "Alphabet Biscuits", Database GNPD [Online]; Mintel; Mar. 2008, XP002635280.
Anonymous, "Light Wholegrain Cookies", Database GNPD [Online]; Mintel; Aug. 2004, XP002635281.
Anonymous, "Cereals and Chocolate Biscuits", Database GNPD [Online]; Mintel; Sep. 2006, XP002635282.
Anonymous, "Spelt Biscuits with Coconut", Database GNPD [Online]; Mintel; Mar. 2010, XP002635283.
Anonymous, "Digestive Light Natural Wheat Biscuits", Database GNPD [Online]; Mintel; Feb. 2010, XP002635284.
Anonymous, "Dinosaur Wholefruit Cookies", Database GNPD [Online]; Mintel; Feb. 2010, XP002635285.
Anonymous, "Peanut & Chocolate Chips Cookies", Database GNPD [Online]; Mintel; Jul. 2008, XP002635286.
Anonymous, "Lemon Shortbread", http://www.gnpd.com/sinatra/gnpd/search_results/&p_page_number=1&p_page_size=30&item_id=1034423, Jan. 2009.
Anonymous, "Biscuits-Patisseries-Pizzas", http://www.ciia-c.com/francais/Docs/Process/biscuits%20patisseries%20pizzas.pdf, 2004.
Li et al., "Cake Baking in Conventional, Impingement and Hybrid Ovens", Journal of Food Science, vol. 61, No. 1, 1996, pp. 188-191.
Moreira, "Impingement Drying of Foods Using Hot Air and Superheated Steam", Journal of Food Engineering, vol. 49, 2001, pp. 291-295.
English Abstract of EP 1712134.

* cited by examiner

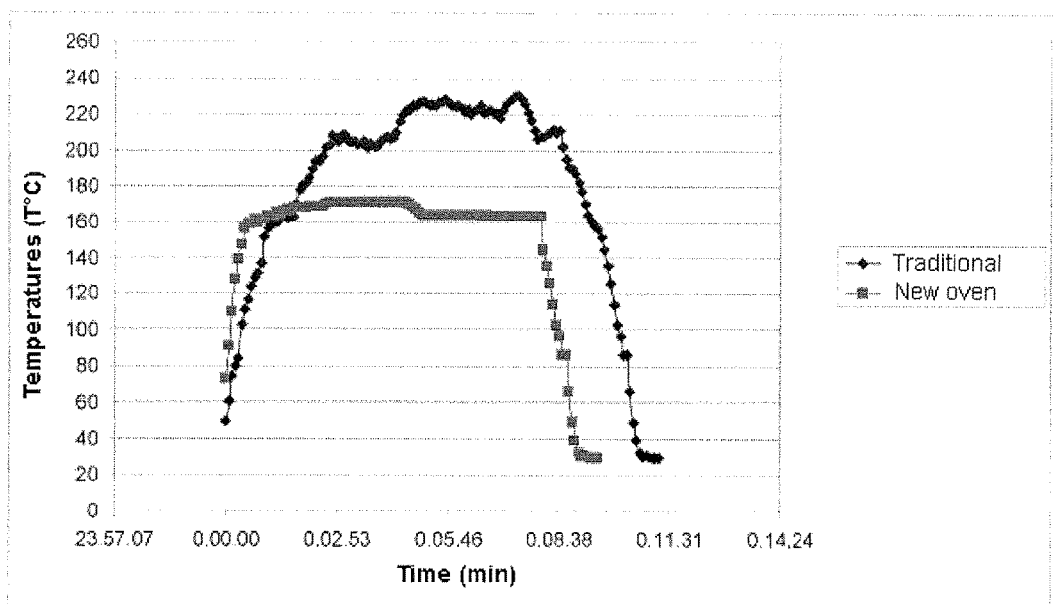
Fig. 1. Baking temperatures diagram

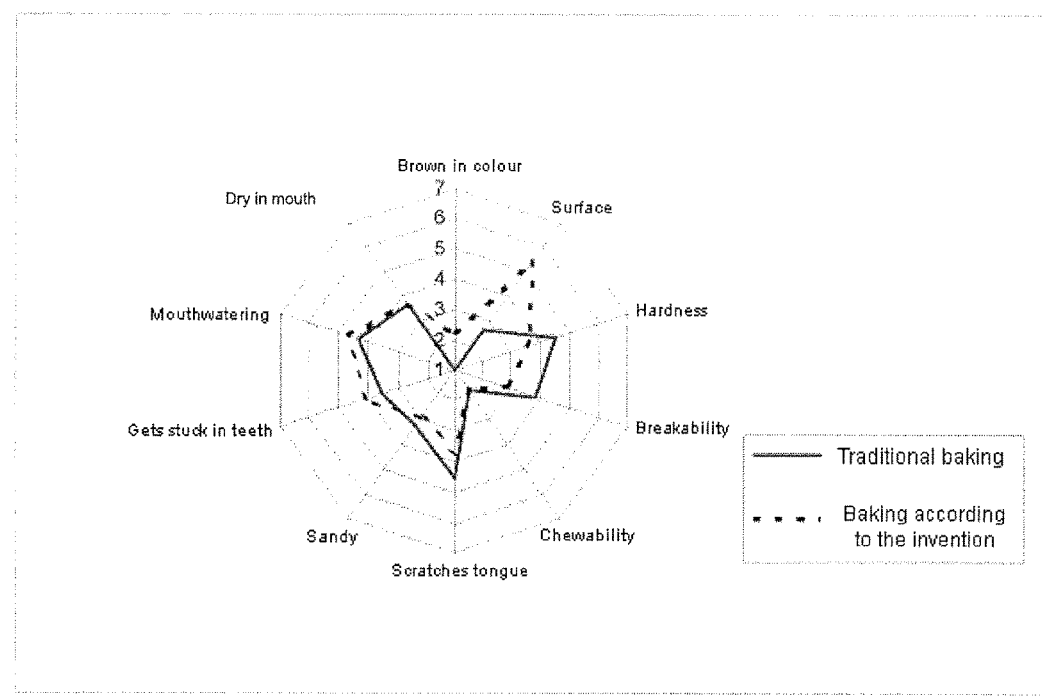
Fig. 2. Example 1: Sensory evalutation profile

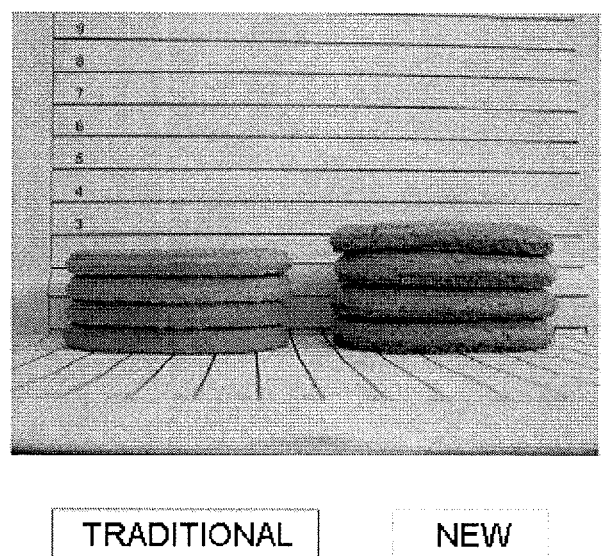
Fig. 3. Example 1: Comparison by appearance and volume

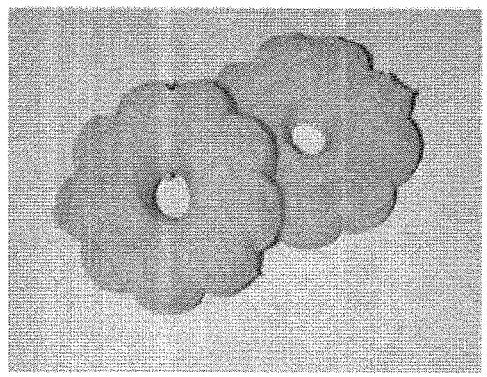 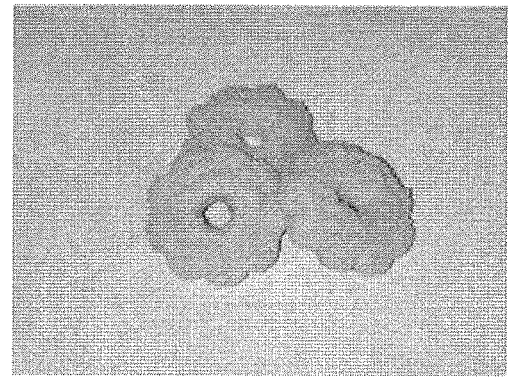
TRADITIONAL                NEW
Fig. 4. Example 2: Comparison by appearance and volume

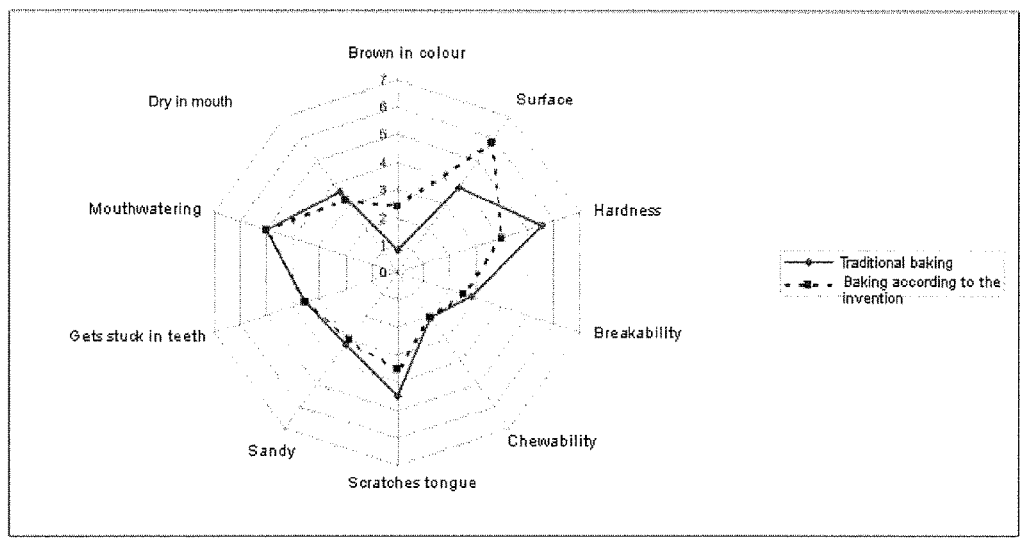
Fig. 5. Example 2: Sensory evaluation profile

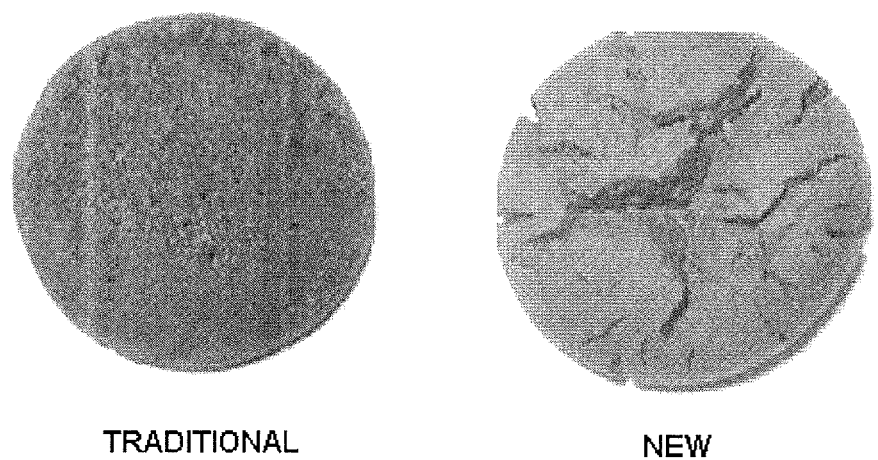
Fig. 6. Example 3: Comparison by appearance and volume

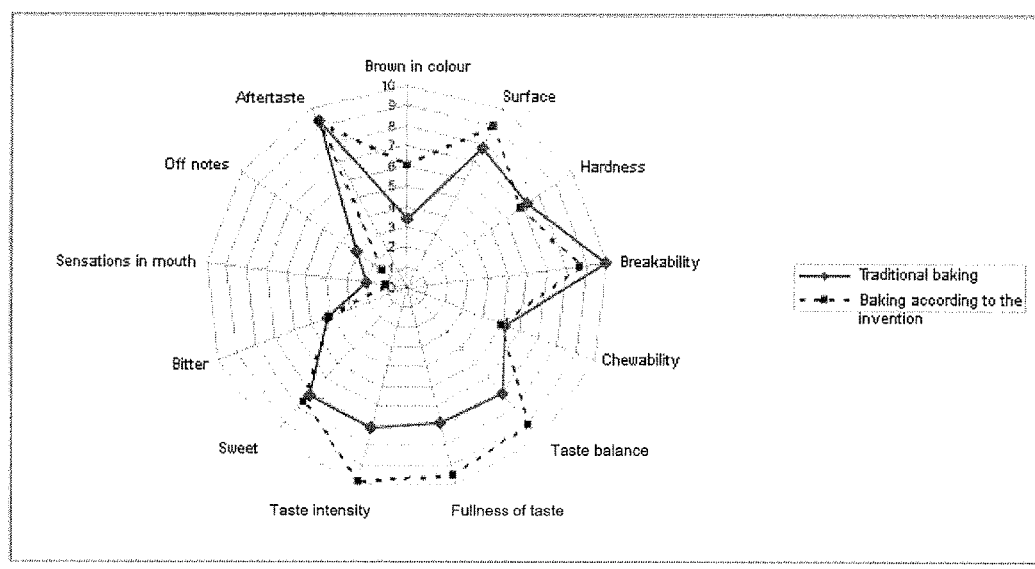
Fig. 7. Example 3: Sensory evaluation profile

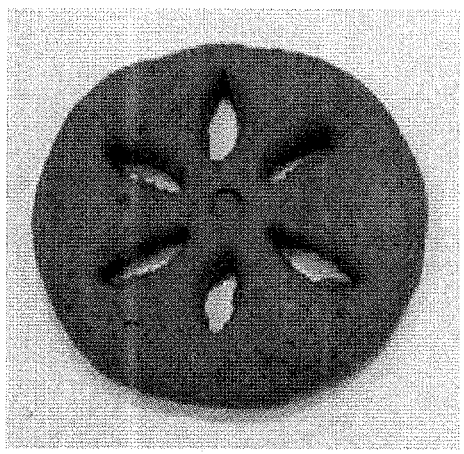 
TRADITIONAL            NEW
Fig. 8. Example 4: Comparison by appearance and volume

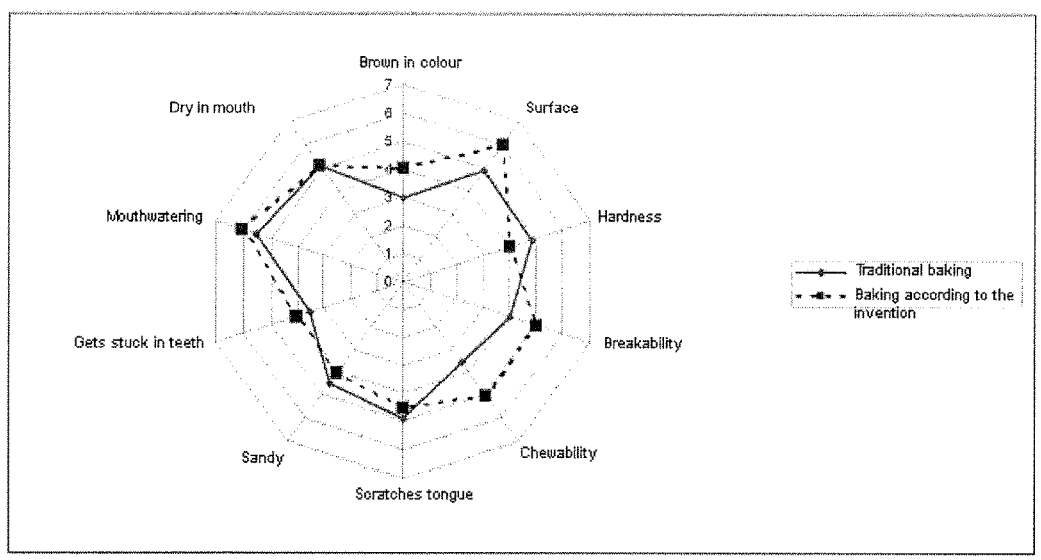
Fig. 9. Example 4: Sensory evaluation profile

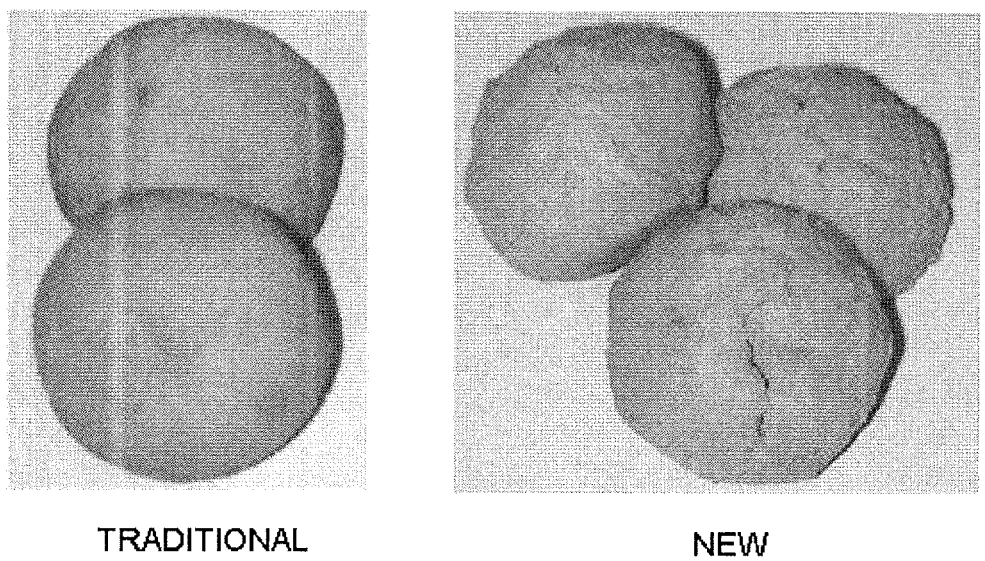
Fig. 10. Example 5: Comparison by appearance and volume

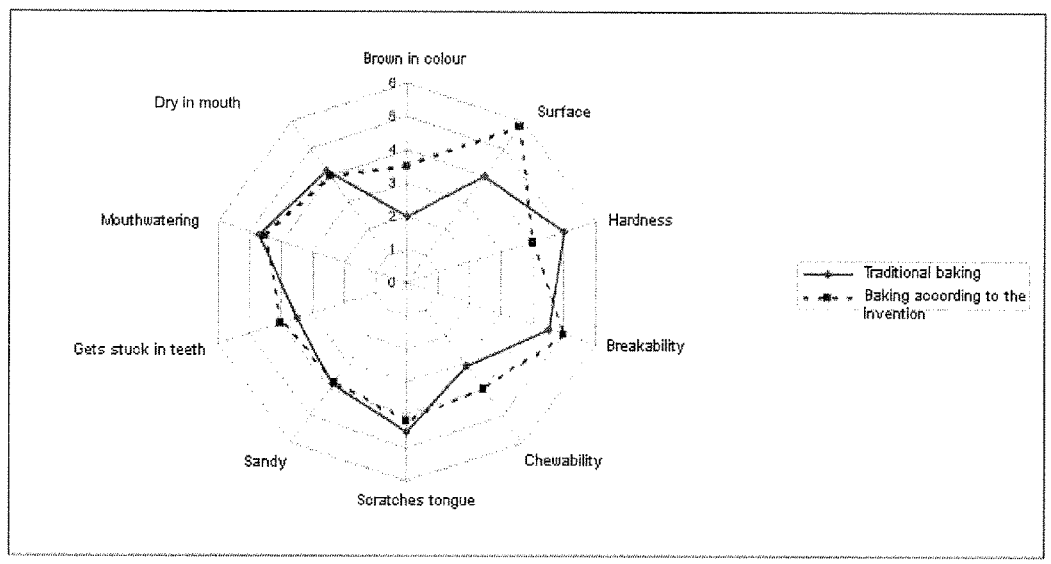
Fig. 11. Example 5: Sensory evaluation profile

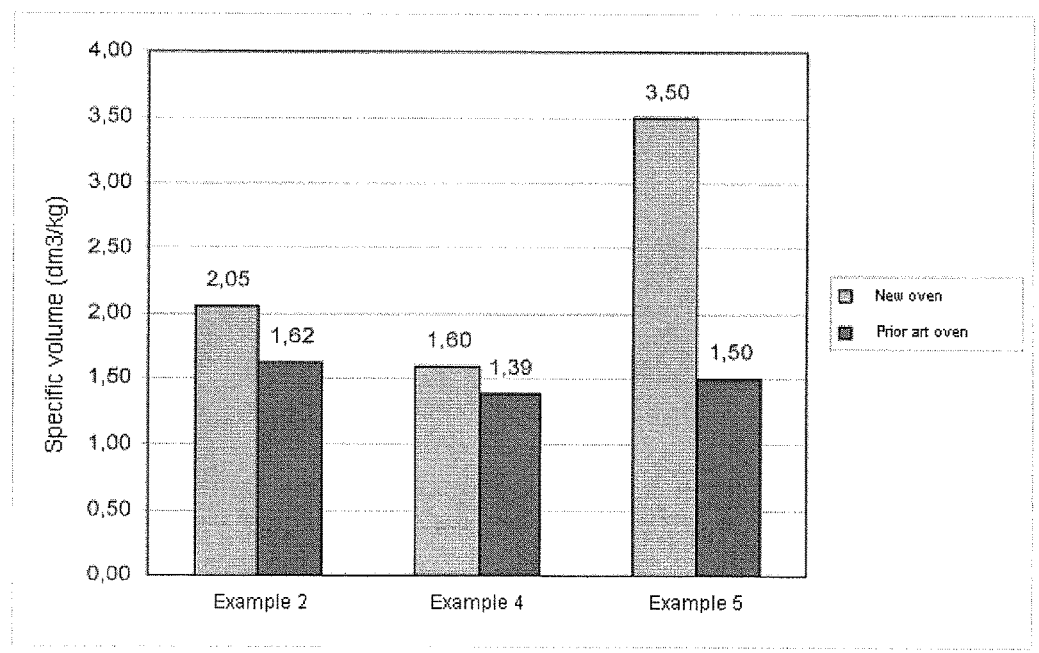
Fig. 12. Examples 1, 4 and 5: Comparison by specific volume

PROCESS FOR THE PRODUCTION OF COOKIES HAVING IMPROVED ORGANOLEPTIC PROPERTIES

CROSS-REFERENCE TO RELATED APPLICATIONS

This application is a continuation-in-part of U.S. patent application Ser. No. 13/095,598, filed Apr. 27, 2011, which claims priority to European Patent Application No. 10425142.6 filed Apr. 30, 2010, the disclosures of which are hereby incorporated by reference in their entirety.

FIELD OF APPLICATION

The present invention relates in general to the technical field of the food industry. More particularly, the present invention relates to a process for the production of cookies, more particularly shortbread type cookies or biscuits, having improved organoleptic, textural, appearance and nutritional characteristics and to the cookies thus obtained.

Short pastes are a technological category of bakery products produced from a dough with a minimum gluten development and a formulation usually rich in fat and sugar (Technology of cakemaking (Bennion et al., 2010)).

Shortbread cookies would normally be made with a high amount of butter and the cookies would exhibit a low specific volume and a closed structure.

The cookie of the invention is a shortbread-like cookie, in that it is made from the same type of dough of a shortbread cookie, having a low gluten development, a very low water content and a brittle structure. Compared to a traditional shortbread cookie, however, the final structure of the cookie of the present invention is lighter and more open, it has a higher specific volume, and exhibits a rough, home-made-like surface.

PRIOR ART

The traditional industrial methods of production of cookies comprise five main steps: the mixing of the ingredients of the dough, the forming of the cookies, the baking, the cooling and, finally, the packaging.

For example, in the production of cookies of the shortbread type, the main ingredients, which comprise for example flour, fats (for example butter or vegetable oils), sugar and eggs, can be mixed in a dough-kneading machine in one or more steps, for variable lengths of times and at variable speeds. The temperature of the dough, which is normally set in the range between 18 and 23° C., is critical during this procedural step as it affects the kneading characteristics of the shortbread type type cookie dough obtained.

Subsequently the dough is conveyed to the forming plant, to confer to it the final shape, depending on the product which is to be obtained.

The cookies thus formed are then sent on to the baking oven where they are subjected to a baking regime which can vary depending on the product which is to be obtained, generally of about 210° C. for 10 minutes approximately and more generally between 190 and 230° C. for 8-15 minutes.

In the food industry, there are various types of oven suitable for the baking of cookies, whose heat exchange characteristics are suitable for the various types of product. Most of the ovens for cookies use a limited circulation of air, especially in the first part of the baking where heat is conveyed mostly by radiation from heated surfaces.

Subsequently the cookies exiting the oven are left to cool and are subsequently sent on to the packaging stations.

With these methods, conventional and good-quality shortbread type type cookies, for example, are obtained which have generally, a lipids content, in weight per total weight, comprised between 17 and 25%, a dietary fibre content below 2%, and a simple sugars content comprised between 18 and 25%, like most shortbread type cookies currently found on the market.

As in many other sectors of the food industry there is however, also in the sector of bakery products, the desire to make available cookies, in particular shortbread type cookies, having improved organoleptic and nutritional properties and having a more genuine taste. For example, there is the desire and the need to make available cookies which maintain as much as possible undamaged the nutritional properties, the taste and the colours of the raw materials used.

Additionally there is the need to make available cookies having an increased dietary fibre content. At the same time, there is also the need to make available cookies having a reduced lipids content. A reduction in the cookies of the simple sugars content is also desirable.

Dietary fibre, both soluble and insoluble, is known, in fact, for being associated with beneficial effects on health. Soluble fibre is associated with the lowering of the blood cholesterol levels and in the risk of cardiovascular diseases, and with the lowering of glycaemia. Insoluble fibre reduces faecal intestinal transit time and contributes towards the modulation of the intestinal flora.

An excessive consumption of lipids, however, particularly of those deriving from saturated animal fats, such as for example butter, or of polyunsaturated vegetable fats subjected to hydrogenation treatments, such as for example in the production of certain margarines, is known for being associated with an increased risk of cardiovascular diseases and/or for the fact of having a negative effect on health.

Simple sugars, also, affect the calorific value of the finished product and are an important source of readily available energy. An excessive consumption of sugars, however, is known to be associated with an increased risk of obesity and diabetes.

It has, however, been found that the use of traditional baking methods, for the preparation of cookies, in particular shortbread type cookies, starting from a dough having a high dietary fibre content and/or low lipids and/or simple sugars content produces shortbread type cookies having poor or even unacceptable organoleptic properties. The cookies thus obtained, in fact, are generally too dense and hard to the bite, the texture is coarse and sandy and the taste unpleasant.

The technology of heat treatment by impingement is used in many sectors of the food industry to surpass in intensity what can be achieved with normal convective heat exchange. The impingement treatment consists in generating in the oven high speed gas jets, directed straight onto the product to be treated.

The impingement treatment is successfully used also for bakery products but normally not in the baking of cookies, as it leads, in normal humidity conditions of the baking air, to an unsatisfactory baking of these latter, with poor development and a closed and hardly crumbly structure.

A thermal process already used in other industrial sectors is the technology known as superheated steam drying (SHSD). This technique uses for drying processes steam at a temperature higher than boiling point (100° C. at ambient pressure). The process has also been proposed at a pressure different from ambient pressure (pressurised or vacuum, and therefore referred to boiling points higher or lower than 100° C.).

In the area of bakery products, the feeding of steam (normally saturated and not superheated) into the baking chamber is rarely used and, in those cases, it is intended either for heating only or for condensation on the surface of the product to achieve a glazed (gelatinised) surface, it not contemplating a systematic, prolonged in time and continuous treatment with superheated steam in order to achieve baking proper.

Impingement technology, like the use of superheated steam (at T>100° C.), is the subject-matter of a certain number of patents.

Examples of patents and patent applications of this type are U.S. Pat. No. 4,965,435 (Smith et al.), U.S. Pat. No. 6,146,678 (Caridis et al.), U.S. Pat. No. 6,572,911 (Corcoran et al.), U.S. Pat. No. 5,786,566 (Miller et al.), U.S. Pat. No. 5,560,952 (Miller et al.), U.S. Pat. No. 4,701,340 (Bratton et al.) and JP 2000236798 (Manabu et al.). None of these patents relate to the production of cookies.

For example, U.S. Pat. No. 6,146,678 (Caridis et al.) describes an oven for the baking of food products by impingement of a process vapour on the food products. The vapour has a temperature comprised between 260 and 540° F. (which corresponds to a range between 127 and 282° C.) for 0.8 to 44 minutes. Foodstuffs suitable for this treatment include sausages, chicken, beef, meatballs, tortillas and bread slices for toasting.

U.S. Pat. No. 6,572,911 (Corcoran et al.) describes an oven for heating and cooking food products, more particularly bakery products. The invention, in particular, is aimed at the baking of bakery products having a dense and soft texture and having a glazed exterior surface. Examples of such products are bagels, soft pretzels, French bread, rye bread and other leavened products.

US patent application No. 2003/0217645 (Jones et al.) relates to a conveyorized oven which comprises a conveyor system for conveying a food product between an entry port and an exit port; an impingement device positioned between the entry port and the exit port and arranged in such a way as to direct jets of air towards the food product; and a fan blower, a heater and a moisture delivery device to obtain in the impingement device a heated and moisture laden airflow such that these jets of air are at a high temperature and laden with moisture, thereby producing a mixture of air and moisture at the surface of the food product. One application of this oven is for example in the heating of a pizza.

U.S. Pat. No. 4,965,435 (Smith et al.) relates to a tunnel oven which comprises a cooking compartment through which the food to be cooked is conveyed on a conveyor which is spaced from the front wall of the cooking compartment to provide an air return route and to provide a walkway to facilitate cleaning and maintenance of the oven. A blower discharges air drawn from the cooking compartment into an air distribution chamber formed in an upper portion of the cooking chamber and spaced from the conveyor. A pair of plenums in the cabinet adjacent one edge of the conveyor deliver air from the distribution chamber to a plurality of air dispensing ducts communicating with the plenums on opposite sides of the conveyor.

Japanese patent application JP 2000236798 (Manabu et al.) describes a method for the production of a product baked in the oven using superheated steam wherein the concentration of oxygen inside the baking chamber is comprised between 3 and 15%. By using this method products are obtained having a moist, soft and elastic texture, which cannot be obtained by cooking methods of the prior art. The products mentioned as suitable for this type of cooking include sponge cake, chicken, fish, etc.

Shortbread type cookies and cookies in general are very dry foods, having a low moisture content, generally lower than 5% ($A_w$ of about 0.3). In line with what is described above there is therefore, in the prior art, no mention of the successful application of this technology specifically for the production of cookies, and more particularly of shortbread type cookies.

The technical problem of the present invention is therefore that of making available a simple and economical process for the production of cookies, in particular shortbread type cookies, having improved organoleptic, textural and nutritional properties, more particularly for the production of a cookie which, compared to a traditional cookie, maintains to a greater extent the nutritional properties and the taste of the ingredients used, having at the same time excellent organoleptic properties, such as for example crumbliness, texture and taste.

More particularly, the technical problem of the present invention is that of making available a simple and economical process for the production of cookies, in particular shortbread type cookies, having a dietary fibre content higher than the typical values for traditional cookies (usually not higher than 2% in weight per total weight), and/or having a lipids content lower than the typical values for conventional cookies (usually not lower than about 17% in weight per total weight), and/or having a simple sugars content lower than the typical values for conventional cookies (usually not lower than about 20% in weight per total weight), and having at the same time excellent organoleptic properties, such as for example crumbliness, texture, and taste.

SUMMARY OF THE INVENTION

Such a problem has been solved by a process for the production of cookies, characterised in that it comprises the steps of:
a) mixing the ingredients of a cookie dough;
b) forming the cookie dough to form semi-finished products;
c) baking the semi-finished products formed from such dough, thus obtaining cookies;
d) cooling the cookies obtained; and
e) packaging the cookies;
wherein step c) of baking such semi-finished products comprises a step of exposure thereof to a hot gas consisting of hot air and superheated steam, blown directly on such semi-finished products by means of an impingement system.

Preferably, the hot gas consisting of hot air and superheated steam has a temperature comprised between 150 and 190° C., preferably between 160 and 175° C.

The step of exposure to the hot gas consisting of hot air and superheated steam is carried out for the time necessary for achieving the baking of the cookies, preferably for a time comprised between 4 and 12 minutes, more preferably between 5 and 10 minutes.

Preferably, such hot gas consisting of hot air and superheated steam has a content of superheated steam comprised between 60 and 99% (in volume per volume), preferably 80%, corresponding to a dew point of between 86 and 99.75° C. The process is preferably carried out at atmospheric pressure.

In a preferred embodiment, such hot gas is blown by a blowing system comprising a plurality of nozzles positioned at a distance from 4 to 15 cm, preferably from 6 to 12 cm, more preferably from 8 to 10 cm from the baking surface whereupon are positioned the semi-finished products formed from the dough.

The hot gas is preferably directed towards the abovementioned semi-finished products at a speed between 2 and 12 m/s, preferably between 4 and 10 m/s, more preferably between 6 and 8 m/s.

Advantageously the hot gas is continuously recirculated, dosed upon entry in the baking chamber and with temperature and moisture content set according to the requirements dictated by the product that is to be obtained.

The process produces, in general, a cookie having, in weight per total weight, a dietary fibre content comprised between 1 and 25%, a lipids content comprised between 4 and 23%, and a simple sugars content comprised between 8 and 26%.

In one aspect of the present invention the process produces a cookie having a dietary fibre content of between 10 and 25%, preferably between 15 and 25%, more preferably between 20 and 25%, even more preferably about 25% in weight per total weight.

Independently of the above-mentioned contents of dietary fibre or in association therewith, the cookie obtained from the process according to the invention has preferably, in weight per total weight, a lipids content comprised between 10 and 20%, more preferably between 12 and 18%, even more preferably about 15%.

Independently of the above-mentioned values of the content of dietary fibre and/or lipids or in association therewith, the cookie obtained with the process according to the invention preferably has a simple sugars content comprised between 12 and 22%, or more preferably of about 15% in weight per total weight.

The cookie obtained with the process according to the method of the invention preferably comprises between 10 and 30%, more preferably between 20 and 30%, even more preferably between 25 and 30% in weight per total weight of dried fruit or pieces of chocolate.

This cookie obtained by the process according to the method of the present invention is preferably a shortbread type cookie.

In the context of the present invention, by "shortbread type cookie" and "cookie of the shortbread type" is meant a cookie or biscuit which has the dough kneading characteristics, when raw, of a shortcrust pastry dough and a high crumbliness when consumed.

The present invention also relates to a cookie having a composition comprising, in weight per total weight, a dietary fibre content comprised between 1 and 25%, a lipids content comprised between 4 and 23% and a simple sugars content comprised between 8 and 26%.

According to one aspect of the invention, the cookie has, in weight per total weight, a dietary fibre content comprised between 10 and 25%, preferably between 15 and 25%, more preferably between 20 and 25%, even more preferably about 25% in weight per total weight, a lipids content comprised between 10 and 20%, preferably between 12 and 18%, more preferably 15% and a simple sugars content comprised between 12 and 22%, preferably 15%.

According to a further aspect of the invention, the cookie has a lipids content comprised between 8 and 18% in weight per total weight.

According to a further aspect of the invention, the cookie has a simple sugars content comprised between 12 and 22%, or preferably of about 20% in weight per total weight.

This cookie preferably comprises between 10 and 30%, preferably between 20 and 30%, more preferably between 25 and 30% in weight per total weight of dried fruit or pieces of chocolate.

Such cookie preferably has a specific volume of 1.60 dm$^3$/kg or greater, more preferably greater than 2.0 dm$^3$/kg, even more preferably of 2.0-3.5 dm$^3$/kg.

This cookie of the invention is preferably shortbread type cookie.

BRIEF DESCRIPTION OF THE DRAWINGS

FIG. 1 is a comparison diagram showing the temperature profile in the baking oven of a cookie of Example 1 prepared according to the traditional process and according to the process of the present invention.

FIG. 2 is a diagram which shows a comparison of the sensory evaluation profiles of the cookies of Example 1 prepared according to the traditional process (unbroken line) and the process of the present invention (dotted line).

FIG. 3 is a comparison photograph showing the appearance and volume of the cookies of Example 1 prepared according to the traditional process and according to the process of the present invention.

FIG. 4 is a comparison of the appearance and volume between photographs of the cookies of Example 2 prepared according to the traditional process and according to the process of the present invention.

FIG. 5 is a diagram which shows a comparison of the sensory evaluation profiles of the cookies of Example 2 prepared according to the traditional process (unbroken line) and according to the process of the present invention (dotted line).

FIG. 6 is a comparison of the appearance and volume between photographs of the cookies of Example 3 prepared according to the traditional process and according to the process of the present invention.

FIG. 7 is a diagram which shows a comparison of the sensory evaluation profiles of the cookies of Example 3 prepared according to the traditional process (unbroken line) and according to the process of the present invention (dotted line).

FIG. 8 is a comparison of the appearance and volume between photographs of the cookies of Example 4 prepared according to the traditional process and according to the process of the present invention.

FIG. 9 is a diagram which shows a comparison of the sensory evaluation profiles of the cookies of Example 4 prepared according to the traditional process (unbroken line) and according to the process of the present invention (dotted line).

FIG. 10 is a comparison of the appearance and volume between photographs of the cookies of Example 5 prepared according to the traditional process and according to the process of the present invention.

FIG. 11 is a diagram which shows a comparison of the sensory evaluation profiles of the cookies of Example 5 prepared according to the traditional process (unbroken line) and according to the process of the present invention (dotted line).

FIG. 12 is a comparison diagram showing the specific volume for the cookies of Examples 2, 4 and 5, prepared according to the traditional process and according to the process of the present invention.

DETAILED DESCRIPTION OF THE INVENTION

The present invention relates to a process for the production of cookies, characterised in that it comprises the steps of:
a) mixing the ingredients of a cookie dough;
b) forming the cookie dough to form semi-finished products;
c) baking the semi-finished products formed from such dough, thus obtaining cookies;
d) cooling the cookies obtained; and
e) packaging the cookies;
wherein the step c) of baking such semi-finished products comprises a step of exposure thereof to a hot gas consisting of hot air and superheated steam, blown directly on such semi-finished products by means of an impingement system. It should be appreciated that the term "cookie" as used herein is intended to cover biscuits and cookies.

The cookie dough may comprise a grain flour, chosen from the group consisting of: type 0 wheat flour, type 00 wheat flour, barley flour, oat flour, rye flour, rice flour, spelt flour, kamut flour, corn flour and mixtures thereof.

Moreover, according to one embodiment, such grain flour may be wholemeal.

Moreover, the cookie dough may comprise a starch chosen from the group consisting of: wheat starch, barley starch, oat starch, rye starch, rice starch, spelt starch, kamut starch, corn starch, potato starch, tapioca starch and mixtures thereof.

The cookie dough may, moreover, comprise a sweetening agent chosen from the group consisting of: powdered sugar, cane sugar, icing sugar, glucose syrups with varying content of simple sugars, honey and mixtures thereof.

Moreover, the cookie dough may comprise one or more grains chosen from the group consisting of: wheat, barley, oat, rye, rice, spelt, kamut, corn and mixtures thereof, wherein such one or more cereals are subjected to a treatment chosen from among extrusion, puffing, caramelisation and any treatment useful for stabilising the structure and prolonging the conservation thereof.

The cookie dough, moreover, may comprise a fat or an oil chosen from the group consisting of: animal fats, vegetable fats, vegetable oils and mixtures thereof.

The cookie dough may also comprise milk or dairy products chosen from the group consisting of: liquid or powder whole milk, liquid or powder skimmed milk, condensed milk, sweetened condensed milk, yogurt, cream and mixtures thereof The cookie dough may also comprise a dietary fibre chosen from the group consisting of: vegetable soluble dietary fibre, legume soluble dietary fibre, cereal grain soluble dietary fibre (such as for example oat beta glucans), cereal grain insoluble dietary fibre and mixtures thereof.

Moreover, the cookie dough may comprise an additional ingredient chosen from the group consisting of: eggs and derivatives, raising agents, water, salt, lecithin of varying origin, preferably from soy or sunflower, dried fruit, nuts and grains, for example almonds, hazelnuts and the like, in pieces or powdered, cocoa powder, for example low fat content, chocolate flakes, chips or drops, flavourings.

The step of mixing the ingredients is carried out according to traditional methods, preferably at the temperature of 18-25° C.

Subsequently the dough is subjected to a forming step by means of cutting or moulds or by extrusion, depending on the product to be obtained, according to methods well known in the industry.

The baking step is performed by the methods described above.

It has been found that, by suitably adjusting the content of superheated steam in the hot gas, it is possible to obtain a hot gas having a moisture content value such that the suitable conditions are created for the baking of cookies even at lower temperatures and in shorter times compared to those normally used in traditional methods of cookie baking. By controlling the content of the superheated steam in the hot gas within the values given above, the conditions are obtained whereby the dew point is between about 86 and 100° C.

It was also surprisingly noted that, by operating in the conditions mentioned above, in addition to obtaining a reduction in the times of baking, cookies were obtained which also exhibited peculiar and improved organoleptic and nutritional properties and having a homemade appearance.

By virtue of the fact that, as mentioned above, the temperatures and the times of baking according to the process of the invention are considerably reduced compared to those usually adopted in traditional baking methods, the cookies obtained, in addition to having excellent organoleptic qualities, will maintain to a greater extent, compared to traditional cookies, the nutritional properties, for example vitamins and proteins, of the raw materials used and the taste will be more genuine and fresher.

In the case, for example, where the is inclusion of fruit, its texture will not be dried up, but chewy, and it will retain a fresher taste compared to that included in traditional cookies.

The cookie, following baking, is then subjected to a cooling step at room temperature in conditions of natural ventilation and is then sent on to the packaging machines according to standard techniques well known in the art.

The cookie obtained by means of the process of the present invention has a typical moisture content for a cookie (5% maximum) and therefore enjoys the same shelf-life of a traditional cookie.

The present invention also refers to the cookie obtained directly by the process of the present invention.

The cookies which are obtained by the process of the present invention, by virtue of the conditions to which they are subjected, are greater in size compared to the corresponding cookies obtained by traditional methods. In fact, the cookies of the invention exhibit an increase in the specific volume, with the surface exhibiting many cracks, and a greater crumbliness.

These data are confirmed by measurements of the density (or of specific volume) and texture profile (sensory analysis profile).

As seen above, the cookie according to the present invention has a specific volume greater than 1.6 $dm^3/kg$, more preferably greater than 2.0 $dm^3/kg$, even more preferably comprised between 2.0 and 3.5 $dm^3/kg$. These values represent an increase in the specific volume value of between about 12 and 200% compared to the value for a traditional cookie, more particularly shortbread type cookie. This result is considered particularly surprising, particularly as regards high fibre content cookies, more particularly shortbread type cookies.

Advantageously, in some of the embodiments (see Example 4) such cookie has a calorie content lower than 400 Kcal/100 g, preferably about 390 Kcal/100 g, even more preferably about 380 Kcal/100 g.

A plant for the continuous production of a cookie according to the process described above comprises typically:

a) a baking chamber;
b) conveyor means for conveying the incoming semi-finished products, for supporting them during baking and while exiting the baking chamber;
c) means for adjusting the temperature and the content of steam of such hot gas;
d) means for impingement of a hot gas in the baking chamber.

The baking chamber consists of a chamber suitable for the baking of cookies, for example an impingement tunnel oven, having an entrance, an exit, conveyor means for conveying the semi-finished products and the cookies which pass through this chamber between the entrance and the exit, and means of impingement of a hot gas directed towards the conveyor means.

The conveyor means may be in the form, for example, of a conveyor belt which has the function of conveying the semi-finished products formed from the dough towards the entrance of the baking chamber and, subsequently, the cookies exiting the baking chamber. Such conveyor belt may have a continuous metal band structure, a wire net structure of varying mesh size or transport the products to be baked in appropriate housings, optionally shaped.

The baking oven includes specific means for the measurement and accurate and continuous adjustment both of the temperature and of the moisture content.

The impingement means may be, for example, in the form of nozzles suitable for directing one or more dosed jets of hot gas at a speed of 2-12 m/s, preferably 4-10 m/s, even more preferably 6-8 m/s from a distance from the conveyor means of 4-15 cm, preferably 6-12 cm, more preferably 8-10 cm. This speed and this distance can be adjusted according to the product to be obtained.

Such nozzles are adequately positioned both above and below the conveyor belt, thus allowing heating also of the conveyor belt. More particularly the speed of impingement of the hot gas may be adjusted to an appropriate intensity and optionally different above and below the conveyor system.

According to a preferred embodiment of the present invention, the conveyor belt is made to advance at a distance of 0.08 m from the hot gas impingement nozzles. In this way the semi-finished products formed from the dough are exposed to the jets of hot gas set at a jet speed of 7 m/s at the temperature of 170° C. for a total time of 5 minutes before the cookies obtained from them are conveyed out of the baking chamber.

The baking chamber comprises, moreover, one or more ports of suction of the hot gas in order to allow recirculation thereof to the heating means and once again into the baking chamber at the required humidity and temperature.

The present invention will be further described with reference to the non-limiting and illustrative examples given herein below.

EXAMPLE 1

Cookie of Conventional Formulation for Shortbread Type Cookie

A cookie dough was prepared according to a recipe for traditional shortbread type cookies, as follows (Table 1):

TABLE 1

Traditional shortbread type cookies recipe

| Ingredients | % (in weight per total weight) |
| --- | --- |
| Type 0 flour | 56.00 |
| Sugar | 17.55 |
| Vegetable fats (palm oil) | 14.00 |
| Salt | 0.30 |
| Raising agents | 0.35 |
| Water | 6.80 |
| Eggs | 5.00 |
| Total | 100.00 |

The ingredients of the shortbread type cookie were kneaded according to traditional kneading methods in a planetary mixer with a mixing tool of the blade type, with the mixing of sugar and fat of the basic recipe until a homogenous mixture was obtained, completed with the addition, in subsequent steps, of the remaining ingredients.

The dough structured in this way was then formed into the final shape with rotary type systems.

The shortbread type cookie thus formed was then subjected, in one case, to traditional baking and, in the other case, to baking according to the process of the present invention, in order to compare the results obtained with the two baking procedures.

The operating parameters of the oven in the two processes can be summarised as follows (Table 2):

TABLE 2

Operating parameters of the oven

| Parameter | Traditional process | Process of the invention |
| --- | --- | --- |
| Temperature | 200 | 170° C. |
| Time | 9 min | 5 min |
| Impingement speed | N/A | 8 m/s |
| Distance of the shortbread type cookie from the impingement source | N/A | 80 mm |
| Percentage of steam in the hot gas | <10% on average | 80% |

The final shortbread type cookie, therefore, had the following percentage proportions of lipids, dietary fibre and simple sugars (Table 3).

TABLE 3

Percentage proportions of lipids, dietary fibre and simple sugars in the final shortbread type cookie

| Component: | % (in weight per total weight) |
| --- | --- |
| Lipids | 18 |
| Dietary fibre | 2 |
| Simple sugars | 20 |

The shortbread type cookie which was obtained from the process of the invention had different dimensions and appearance compared to the shortbread type cookie obtained by a traditional process (see FIG. 1, which summarises the temperature profiles during baking for the two processes, where it is shown that traditional baking is associated to a higher temperature profile compared to the process of the invention and, despite this, a reduction in the baking time in this latter case).

More particularly an increase in the specific volume (see FIG. 12) was observed, accompanied by a surface appearance showing many cracks, with different protrusion patterns and contours (see FIG. 3).

These variations find correspondence also in the structural variations which can be perceived upon tasting, more particularly a greater crumbliness.

These data are also confirmed by instrumental tests such as the measuring of the density and by the sensory evaluation profile obtained from a sensory analysis performed by a panel of experts (see FIG. 2).

EXAMPLES 2-5

Doughs were prepared for the following cookies according to the recipes of Table 4 below:

EXAMPLE 2

Low-Calorie Cookie Obtained by the Reduction of the Lipids Content

EXAMPLE 3

Cookie having Increased Dietary Fibre Content

EXAMPLE 4

Cookie having A High Dietary Fibre Content and A Reduced Lipids and Simple Sugars Content; and

EXAMPLE 5

Cookie having an Increased Dietary Fibre Content and A Reduced Lipids and Simple Sugars Content

TABLE 4

Recipes of the cookies of Examples 2-5

| | Example number: | | | |
|---|---|---|---|---|
| Ingredients | 2 % (in weight per total weight) | 3 % (in weight per total weight) | 4 % (in weight per total weight) | 5 % (in weight per total weight) |
| Type 0 flour | 63.00 | 17.00 | | |
| Wholemeal flour | | 7.00 | 27.00 | 38.7 |
| Sugar | 14.00 | 13.00 | 13.00 | 13.00 |
| Fats and/or vegetable oils | 5.80 | 16.70 | 11.00 | 12.00 |
| Glucose syrup | 4.00 | 2.00 | 2.00 | 4.00 |
| Lecithin | 1.00 | | | |
| Eggs | | | | 7.60 |
| Milk | | 5.00 | 5.00 | |
| Powder skimmed milk | | 4.50 | 4.50 | 4.50 |
| Powder skimmed milk | | | | 8.00 |
| Water | 11.00 | | | |
| Dried fruit | | 2.70 | | |
| Milled almond | | 5.00 | | |
| Oat flakes | | | 8.00 | |
| Salt | 0.20 | 0.30 | 0.20 | 0.20 |
| Raising agents | 1.00 | 0.80 | 0.80 | 1.80 |
| Soluble dietary fibre | | 6.50 | 6.50 | 10.00 |
| Insoluble dietary fibre | | 19.50 | 22.00 | |
| Flavourings | | | | 0.20 |
| Total | 100 | 100 | 100 | 100 |

The ingredients of the cookies of each example were kneaded according to traditional kneading methods in a planetary mixer with mixing tool of the mixing blade type, with the mixing of sugar and fat of the basic recipe until a homogenous mixture was obtained, completed with the addition, in subsequent steps, of the remaining ingredients.

The doughs structured in this way were then formed into the final shape with rotary type systems and placed on the oven conveyor belt.

The cookies of each example thus formed were then subjected, in one case, to traditional baking and, in the other case, to baking according to the process of the present invention, in order to compare the results obtained with the two baking procedures.

The operating parameters of the oven can be summarised as follows (Table 5):

TABLE 5

Operating parameters of the oven

| | | Process of the invention Example number | | | |
|---|---|---|---|---|---|
| Parameters | Traditional process | 2 | 3 | 4 | 5 |
| Temperature | 200 | 170° C. | 170° C. | 170° C. | 170° C. |
| Time | 9 min | 5 min | 7 min | 5 min | 6 min |
| Impingement speed | N/A | 5.5 m/s | 7.0 m/s | 8.0 m/s | 7.0 m/s |
| Distance of the cookie from the impingement source | N/A | 80 mm | 80 mm | 80 mm | 80 mm |
| Percentage of steam in the hot gas | <10% on average | 80% | 70% | 70% | 70% |

The final cookies had, therefore, the following percentage proportions of lipids, dietary fibre and simple sugars (Table 6).

TABLE 6

Percentage proportions of lipids, dietary fibre and simple sugars in the final cookies

| | Example number | | | |
|---|---|---|---|---|
| | 2 | 3 | 4 | 5 |
| Component: | % (in weight per total weight) | % (in weight per total weight) | % (in weight per total weight) | % (in weight per total weight) |
| Lipids | 10 | 18 | 14 | 14 |
| Dietary fibre | 3 | 25 | 25 | 11 |
| Simple sugars | 20 | 20 | 15 | 14 |
| Calorie content | | | 390 kcal/100 g | |
| Specific volume | | | | 3.5 dm$^3$/kg |

The traditional baking of cookies having low lipids content (Example 2) gives them closed structures and hardness at the bite, in addition to difficulty in swallowing. With the process of the present invention open structures are generated which maintain a crumbliness comparable to conventional cookies, a cracked appearance (see FIGS. 4 and 5) and an increase in the size, also shown by the measurements of the specific volume (see FIG. 12).

The formulation of the cookies of Example 3, relating to high dietary fibre content cookies, when subjected to traditional baking produces cookies with closed structure which are hard to the bite and with a very sandy structure, hardly acceptable organoleptically. The baking according to the process of the invention gives the product a cracked and open surface (see FIG. 6), a crumbly and open structure and therefore improved from the organoleptic point of view, and improvements also in the taste, which is fuller and of greater intensity, as shown by the sensory evaluation profile shown in FIG. 7.

The final cookie of Example 4, having a low lipids and simple sugars content and a high fibre content, kneaded according to the method of the invention, has a cracked surface (see FIG. 8), a greater specific volume (see FIG. 12), an open structure and a high crumbliness, characteristics which are completely different from the corresponding cookie baked according to the traditional method, which is instead hard to the bite, with closed structure and low crumbliness (see also the sensory evaluation profile shown in FIG. 9).

The final cookie of Example 5, having a low lipids and simple sugars content and an increased fibre content, manufactured according to the method of the invention, has a cracked surface (see FIG. 10), higher specific volume (see FIG. 12), an open structure and high crumbliness, also shown by the sensory profile produced by a panel of experts where it was found in particular that the chewability and breakability increase compared to the traditionally prepared counterpart (see FIG. 11).

Thanks to the technology of the present invention, therefore, it is possible to obtain excellent results from the organoleptic point of view from doughs having a composition significantly richer in dietary fibre compared to a traditional cookie dough, and from a dough lower in lipids and from a dough having reduced simple sugars content.

The advantages of this technique lie also in the fact of requiring less energy compared to conventional methods of baking and of allowing the production of improved foods from the organoleptic and nutritional point of view.

In fact, since the baking according to this process takes place with reduced concentration of oxygen in the chamber, the oxidation reactions are limited. This characteristic, in association with the fact that the temperatures and the times of baking are reduced, allows cookies to be obtained which have an improved nutritional profile, wherein the vitamins, the proteins and the lipids of the raw materials are maintained undamaged. Moreover the taste will be more genuine and the texture more pleasant.

Finally, the process of the present invention is simple and economical to carry out because the superheated steam can be recycled from the baking chamber, heated again and reused, with considerable energy saving. This technique is also suitable for being integrated easily in already existing systems of continuous production of cookies.

We claim:

1. A process for the production of shortbread cookies, comprising the steps of:
   a) mixing the ingredients of a cookie dough;
   b) forming said cookie dough to form semi-finished products;
   c) baking the semi-finished products formed from said dough, thus obtaining cookies;
   d) cooling the cookies obtained; and
   e) packaging said cookies;
      wherein the step c) of baking said semi-finished products comprises a step of exposure thereof to a hot gas having a temperature comprised between 150 and 190° C. and consisting of hot air and superheated steam wherein the content of superheated steam, in volume per total volume, is comprised between 60% and 99%, blown directly on said semi-finished products by means of an impingement system comprising a plurality of nozzles positioned at a distance from 4 to 8cm from the baking surface upon which said semi-finished products formed from the dough are positioned, and wherein said hot gas is directed towards said semi-finished products at a speed comprised between 2 and 12 m/s;
   wherein said process produces a cookie having a rough, cracked and open surface, and having in weight per total weight, a dietary fibre content comprised between 10 and 25%, a lipids content comprised between 10 and 20% and a simple sugars content comprised between 12 and 22%, and having a value for specific volume of 2.0-3.5 dm3/kg.

2. The process according to claim 1, wherein said step of exposure to said hot gas consisting of hot air and superheated steam is carried out for between 4 and 12 minutes as the time necessary for achieving the baking of the cookies.

3. The process according to claim 2, wherein said process is carried out at atmospheric pressure.

4. The process according to claim 1, wherein said process produces a cookie having a dietary fibre content comprised between 15 and 25% in weight per total weight.

5. The process according to claim 1, wherein said process produces a cookie having a lipids content comprised between 12 and 18% in weight per total weight.

6. The process according to claim 1, wherein said process produces a cookie having a simple sugars content comprised of about 15% in weight per total weight.

7. The process according to claim 1, wherein said process produces a cookie which comprises between 10 and 30% in weight per total weight of dried fruit or pieces of chocolate.

8. The process of claim 1, wherein said hot gas consisting of hot air and superheated steam has a temperature comprised between 160 and 175° C.

9. The process according to claim 2, wherein said step of exposure to said hot gas consisting of hot air and superheated steam is carried out for between 5 and 10 minutes.

10. The process according to claim 1, wherein said hot gas has a content of superheated steam, in volume per total volume, of 80%.

11. The process according to claim 1, wherein said hot gas is directed towards said semi-finished products at a speed comprised between 6 and 8 m/s.

12. The process according to claim 4, wherein the dietary fibre content is comprised between 20 and 25% in weight per total weight.

13. The process according to claim 4, wherein the dietary fibre content is about 25% in weight per total weight.

14. The process according to claim 1, wherein the lipids content is about 15% in weight per total weight.

15. The process according to claim 7, wherein said process produces a cookie which comprises between 25 and 30% in weight per total weight of dried fruit or pieces of chocolate.

\* \* \* \* \*